United States Patent [19]
Tobias

[11] Patent Number: 6,102,065
[45] Date of Patent: Aug. 15, 2000

[54] LIQUID PROPANE DELIVERY SYSTEM

[76] Inventor: Stewart W. Tobias, 1611 18th Ave. Dr., East Palmetto, Fla. 34221

[21] Appl. No.: 09/243,139

[22] Filed: Feb. 3, 1999

[51] Int. Cl.[7] ........................................................ B67D 5/04
[52] U.S. Cl. ........................... 137/255; 137/263; 180/314
[58] Field of Search ................................... 137/255, 263, 137/597, 861, 266; 180/314

[56] References Cited

U.S. PATENT DOCUMENTS 3,710,809  1/1973  Brown et al. ...................... 137/266 X

*Primary Examiner*—Kevin Lee
*Attorney, Agent, or Firm*—Charles J. Prescott

[57] ABSTRACT

A liquid propane reserve system for providing propane to propane operated equipment including a reserve tank interconnected between a main tank and the equipment. Each tank includes a manual shutoff valve so that the main tank may first selectively be depleted of propane after which propane in the reserve tank may then be made available to the equipment without partially refilling the main tank. When the main tank is substantially full by momentarily opening both of the shutoff valves, the reserve tank is quickly refilled and held in reserve until needed by simply closing the second shutoff valve.

5 Claims, 2 Drawing Sheets

LIQUID PROPANE DELIVERY SYSTEM

BACKGROUND OF THE INVENTION

1. Scope of Invention

This invention relates generally to a fuel system supply, and more particularly to a liquid propane reserve system for use in conjunction with industrial vehicles powered by liquid propane.

2. Prior Art

Liquid propane is commonly used in industrial equipment installations due to the cleaner burning benefits achieved during internal combustion engine operation of such industrial equipment in enclosed areas such as those found in a warehouse or manufacturing facility. Liquid propane is also used in many residential and commercial installations for both heating and operating of commercial equipment such as stoves and refrigerators.

In many of these installations, determining the amount of liquid propane remaining in such storage tanks is quite difficult to determine. Moreover, when such tanks are disconnected for refilling and the tank still contains a useful amount of liquid propane, the propane refilling company will normally charge the user the full amount of the capacity of the tank with no credit given for any useful amounts of remaining propane in the tank.

As a result, much of the commercial equipment dependent upon liquid propane is operated until the tank is fully emptied. In the case of any such commercial equipment such as a forklift truck, the operator is then forced to retrieve a fresh tank of liquid propane before continuing with the work tasks at hand. This represents a significant delay in every day commercial productivity.

Sims, in U.S. Pat. No. 5,704,387 discloses a propane reserve tank which is intended to address this very problem particularly focusing on forklift trucks and other inside use industrial vehicles where liquid propane is the fuel of choice for environmental cleanliness. Sims does teach a propane reserve system including a reserve tank which automatically functions to open the filled reserve tank when the pressure level in the main tank drops to a preselected level. However, the Sims fuel control network between the engine, the main tank and the reserve tank is quite complex and may not represent a reliable or economically viable answer to this long-felt need in this industry. Moreover, there is no assurance that the main tank will be emptied before the reserve tank is automatically engaged.

The present invention provides a system including a reserve tank system which is extremely simple in nature and one which is manually operated by the vehicle or equipment operator to insure reliability in an economical fashion and without the need for removal of the reserve tank for refilling which may be yet another drawback to the Sims' system.

BRIEF SUMMARY OF THE INVENTION

This invention is directed to a liquid propane reserve system for providing propane to propane operated equipment including a reserve tank interconnected between a main tank and the equipment. Each tank includes a manual shutoff valve so that the main tank may first selectively be fully depleted of useful amounts of propane after which propane in the reserve tank may then be made available to the equipment without partially refilling the main tank. When the main tank is substantially full by momentarily opening both of the shutoff valves, the reserve tank is quickly refilled and held in reserve until needed by simply closing the second shutoff valve.

It is therefore an object of this invention to provide a reserve tank and associated fuel delivery system enhancements associated with a conventional liquid propane tank and propane operated equipment which remains in ready reserve for manual access to the stored liquid propane in the reserve tank.

It is yet another object of this invention to provide an economical and easily manually operable propane reserve system for industrial vehicles which operate on liquid propane.

It is still another object of this invention to provide a liquid propane reserve system which includes a reserve tank which will automatically be filled when a fresh supply of liquid propane is placed into the main tank of the equipment.

And yet another object of this invention is to provide a propane reserve system which insures that virtually all of the useful liquid propane contained in the main tank of the equipment is utilized before the operator is required to manually interconnect the stored reserve liquid propane supply in the reserve tank.

In accordance with these and other objects which will become apparent hereinafter, the instant invention will now be described with reference to the accompanying drawings.

DETAILED DESCRIPTION OF THE INVENTION

Figure 1:
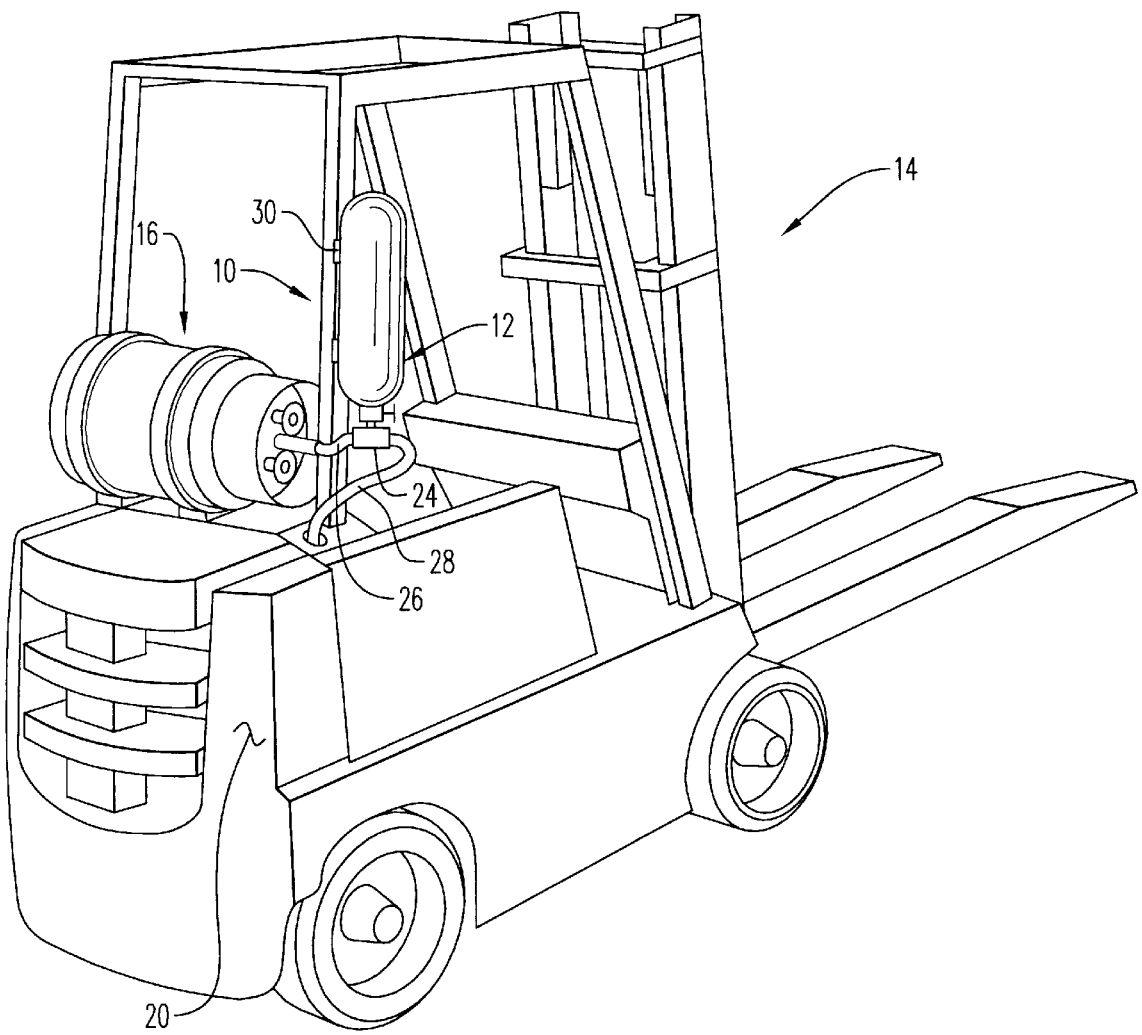
FIG. 1 is a perspective view of a liquid propane powered forklift truck which includes the present invention.

Referring now to the drawings, the invention is shown generally at numeral 10 in conjunction with a conventional liquid propane powered forklift truck 14. The liquid propane reserve system 10 generally includes a reserve tank 12 and associated conduit means described herebelow in conjunction with a main tank 16 for storing liquid propane and the liquid propane powered engine 20.

The main tank 16 including a manual shutoff valve 18 provides a supply of liquid propane flowing outwardly therefrom in the direction of arrow A through a first conduit 26. In normal operation with the useful amount of liquid propane remaining in the main tank 16, the flow of propane fuel continues in the direction of arrow B straight through a T-junction 24 and into an outlet conduit 28 which is interconnected to the engine 20. Propane is thus supplied on a continuous basis from the main tank 16 to the engine 20 on this basis until the supply of liquid propane is exhausted or otherwise inaccessible for use from the main tank 16.

When the liquid propane supply in the main tank 16 is exhausted, obviously the engine 20 will cease to operate. The operator at this point will first close the manual shutoff valve 18 and then open a second manual shutoff valve 22, previously closed, which will thereby make available a reserve supply of liquid propane stored within the reserve tank 12. With the first shutoff valve 18 closed, the propane fuel will flow from the reserve tank 12 only in the direction of arrow E through the second conduit 32, into the T-junction 24 and then into the outlet conduit 28 in the direction of arrows B and C to allow resumption of engine 20 operation.

It would normally be during this time period of using the propane fuel from the reserve tank 12 that the operator would then drive the vehicle 14 to a location for refilling the main tank 16. A very distinctive benefit of the present invention is now realized. When the main tank 16 is refilled and reconnected to the first conduit 26, the reserve tank 12 may then be refilled or topped off regardless of how much liquid propane remains therein. This is accomplished by first opening shutoff valve 18 and then momentarily opening shutoff valve 22. Liquid propane will then flow from the main tank 16 in the direction of arrow A through the first conduit 26, into the T-junction 24, through the second conduit 32 and shutoff valve 22 in the direction of arrow D to fully refill the reserve tank 12. Applicant has found that this refilling of the reserve tank 12 in this fashion occurs almost immediately so that very little operating time is lost in accomplishing the refilling of the reserve tank 12. After the refilling of the reserve tank 12, the shutoff valve 22 is then closed. The equipment may then continue to be operated from the propane fuel supply contained within the main tank 16.

Figure 2:
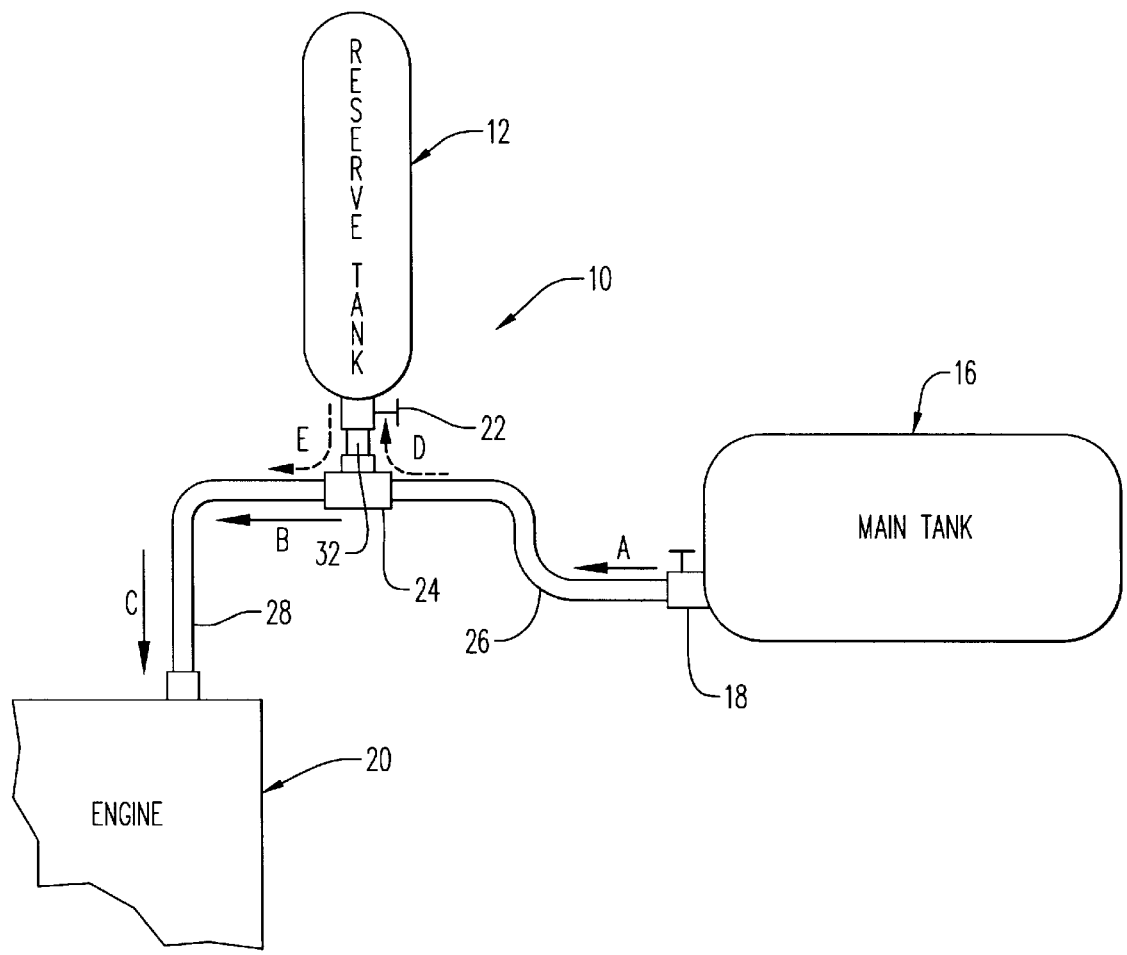
FIG. 2 is a schematic view of the liquid propane reserve system of the forklift truck in FIG. 1.

By arranging the liquid propane reserve tank system components in the vertical relationship shown in FIG. 2 wherein the engine 20 is at a lowest point, the main tank 16 is somewhat above the outlet conduit 28 as it attaches to the engine 20 and wherein the reserve tank 12 and the shutoff valve 22 are somewhat above the main tank 16, the above described liquid propane flow management system appears to work at its best. The reserve system 10, is assisted somewhat by gravity with respect to the shutoff valves 18 and 22 and the ease with which the reserve tank 12 is refilled from pressurized liquid propane contained in a freshly filled main tank 16.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A liquid propane delivery apparatus including a main tank, a reserve tank, output conduit connectable to a liquid propane operated apparatus and a conduit assembly interconnecting said main tank, reserve tank and output conduit, said conduit assembly consisting essentially of:

a first conduit connectable to a first shutoff valve disposed on said main tank and in fluid communication with said output conduit, said first shutoff valve allowing liquid propane flow to said first conduit when said first shutoff valve is in said open position;

a second conduit connectable to a second shutoff valve on said reserve tank and in fluid communication between said first conduit and said outlet conduit, said second valve operative to move from a closed position to an open position allowing liquid propane flow into said second conduit and into said reserve tank from said main tank when in said open position;

liquid propane in said reserve tank flowing into said output conduit only when said main tank has been substantially depleted of liquid propane and said first shutoff valve is closed and said second shutoff valve is opened;

said reserve tank oriented with said second shutoff valve positioned at a lower point of said reserve tank and above said first shutoff valve whereby only liquid propane is drawn from said reserve tank until the supply of liquid propane in said reserve tank is exhausted when said second shutoff valve is open.

2. A liquid propane delivery apparatus including a main tank, a reserve tank, an output conduit connectable to an engine operated by liquid propane and a conduit assembly interconnecting said main tank, reserve tank, and output conduit said conduit assembly consisting essentially of:

a T-junction;

a first shutoff valve on said main tank moveable from a closed position to an open position;

a first conduit hydraulically connecting said T-junction and the primary tank when said first shutoff valve is in said open position;

a second shutoff valve on said reserve tank moveable from a closed position to an open position;

a second conduit hydraulically connecting said T-junction and said reserve tank when said second shutoff valve is in said open position;

an output conduit hydraulically connected to said T-junction;

said reserve tank oriented with said second shutoff valve positioned at a lowest point of said reserve tank and at least as high as said first shutoff valve whereby only liquid propane is drawn from said reserve tank until the supply of liquid propane in said reserve tank is exhausted when said second shutoff valve is open.

3. A liquid propane fueled apparatus comprising:

a body having a fuel supply conduit;

a main tank coupled to said body;

a reserve tank coupled to said body;

conduit and manual shutoff valve means interconnecting said main tank, said reserve tank, and said fuel supply conduit for selectively communicating liquid fuel first from said main tank and, when said main tank is substantially empty, from said reserve tank to said fuel supply conduit, and for communicating fuel from said main tank to fill said reserve tank when said main tank contains sufficient liquid propane and said reserve tank is substantially empty, after which said reserve tank is closed;

said reserve tank operably elevated above said main tank whereby only liquid propane is drawn from said reserve tank until the supply of liquid propane in said reserve tank is exhausted.

4. A forklift comprising:

a body;

an engine coupled to said body;

a primary fuel tank coupled to said body;

a reserve tank coupled to said body and operably elevated with respect to said primary tank;

conduit and manual shutoff valve means interconnecting said main tank, said reserve tank, and said fuel supply conduit for selectively communicating fuel first from said main tank and, when said main tank is substantially empty, from said reserve tank to said fuel supply conduit, and for communicating fuel from said main tank to fill said reserve tank when said main tank contains sufficient liquid propane and said reserve tank is substantially empty, after which said reserve tank is closed;

said reserve tank oriented with said second shutoff valve positioned at a lower point of said reserve tank and above said first shutoff valve whereby only liquid propane is drawn from said reserve tank until the supply of liquid propane in said reserve tank is exhausted when said reserve tank valve is open.

5. In a liquid propane delivery apparatus including a main tank, a first manually operated shutoff valve opening and closing said main tank and a first conduit connectable to said main tank at one end of said first conduit and to an outlet conduit connected to liquid propane operated apparatus at another end of said first conduit, the improvement consisting essentially of:

a reserve tank and a second manually operated shutoff valve opening and closing said reserve tank;

an open T-style junction in said first conduit;

a second conduit connectable at one end thereof to said second shutoff valve and to said T-style junction at another end of said second conduit, liquid propane from a partially or substantially filled main tank substantially filling said reserve tank when said first and second shutoff valves are simultaneously momentarily opened, liquid propane selectively communicated first from said main tank by opening said first shutoff valve and closing said second shutoff valve and from said reserve tank when said main tank is substantially empty by closing said first shutoff valve and opening said second shutoff valve;

said reserve tank elevated above said main tank whereby only liquid propane is drawn from said reserve tank until the supply of liquid propane in said reserve tank is exhausted when said second shutoff valve is open.

* * * * *